United States Patent
Becker et al.

(10) Patent No.: US 7,596,575 B2
(45) Date of Patent: Sep. 29, 2009

(54) AUTOMATION SYSTEM WITH AUTOMATION OBJECTS CONSISTING OF MODULE COMPONENTS

(75) Inventors: Norbert Becker, Erlangen (DE); Georg Biehler, Nuremberg (DE); Matthias Diezel, Laufamholz (DE); Albrecht Donner, Markersdorf (DE); Dieter Eckardt, Herzogenaurach (DE); Harald Herberth, Oberasbach (DE); Manfred Kraemer, Wendelstein (DE); Dirk Langkafel, Effeltrich (DE); Ralf Leins, Ispringen (DE); Ronald Lange, Fuerth (DE); Walter Moeller-Nehring, Erlangen (DE); Juergen Schmoll, Markt Berolzheim (DE); Karsten Schneider, Erlangen (DE); Ulrich Welz, Herzogenaurach (DE); Helmut Windl, Peisig (DE)

(73) Assignee: Siemens Aktiengesellschaft, Munich (DE)

( * ) Notice: Subject to any disclaimer, the term of this patent is extended or adjusted under 35 U.S.C. 154(b) by 975 days.

(21) Appl. No.: 09/948,563

(22) Filed: Sep. 10, 2001

(65) Prior Publication Data
US 2002/0072819 A1 Jun. 13, 2002

Related U.S. Application Data

(63) Continuation of application No. PCT/DE00/00741, filed on Mar. 9, 2000.

(30) Foreign Application Priority Data
Mar. 9, 1999 (DE) .............................. 199 10 536.7

(51) Int. Cl.
*G06F 17/00* (2006.01)
(52) U.S. Cl. ..................... 707/102; 707/100; 707/101
(58) Field of Classification Search ................. 717/116; 345/473; 707/103 R, 103 Y, 103 Z, 100–102
See application file for complete search history.

(56) References Cited

U.S. PATENT DOCUMENTS

| 5,883,639 | A | * | 3/1999 | Walton et al. ............... 345/473 |
| 6,064,812 | A | * | 5/2000 | Parthasarathy et al. ...... 717/116 |
| 6,185,477 | B1 | | 2/2001 | Palm et al. .................. 700/197 |
| 6,275,828 | B1 | * | 8/2001 | Lee et al. .................... 707/103 |

FOREIGN PATENT DOCUMENTS

| EP | 0603560 B1 | 6/1994 |
| WO | WO 9711415 A | 3/1997 |

OTHER PUBLICATIONS

Majapuro et al., "A Modular Software Architecture for Manufacturing Control", IEEE, XP000679407, Aug. 24, 1994, pp. 1745-1750.

(Continued)

*Primary Examiner*—Sana Al-Hashemi
(74) *Attorney, Agent, or Firm*—Staas & Halsey LLP

(57) ABSTRACT

An automation system with at least one automation object having a first component for generating a system functionality, a second component for generating a base functionality, and a third component for managing at least one module. Each module has a first module component for generating a system functionality, a second module component for generating a base functionality and a third module component for generating a technological functionality.

10 Claims, 4 Drawing Sheets

OTHER PUBLICATIONS

Mick, "Client/Server Computing Comes to the Plant Floor", I&CS—Instruments and Control Systems, vol. 66, No. 9, XP000402803, Sep. 1993, pp. 41-42 and 47-49.

Kaiser, "The Simatic S7 'Specialists': Your Guarantee of Top Manufacturing Quality and Productivity", Engineering & Automation, vol. 18, No. 1, XP000581132, Jan./Feb. 1996, pp. 6-7.

* cited by examiner

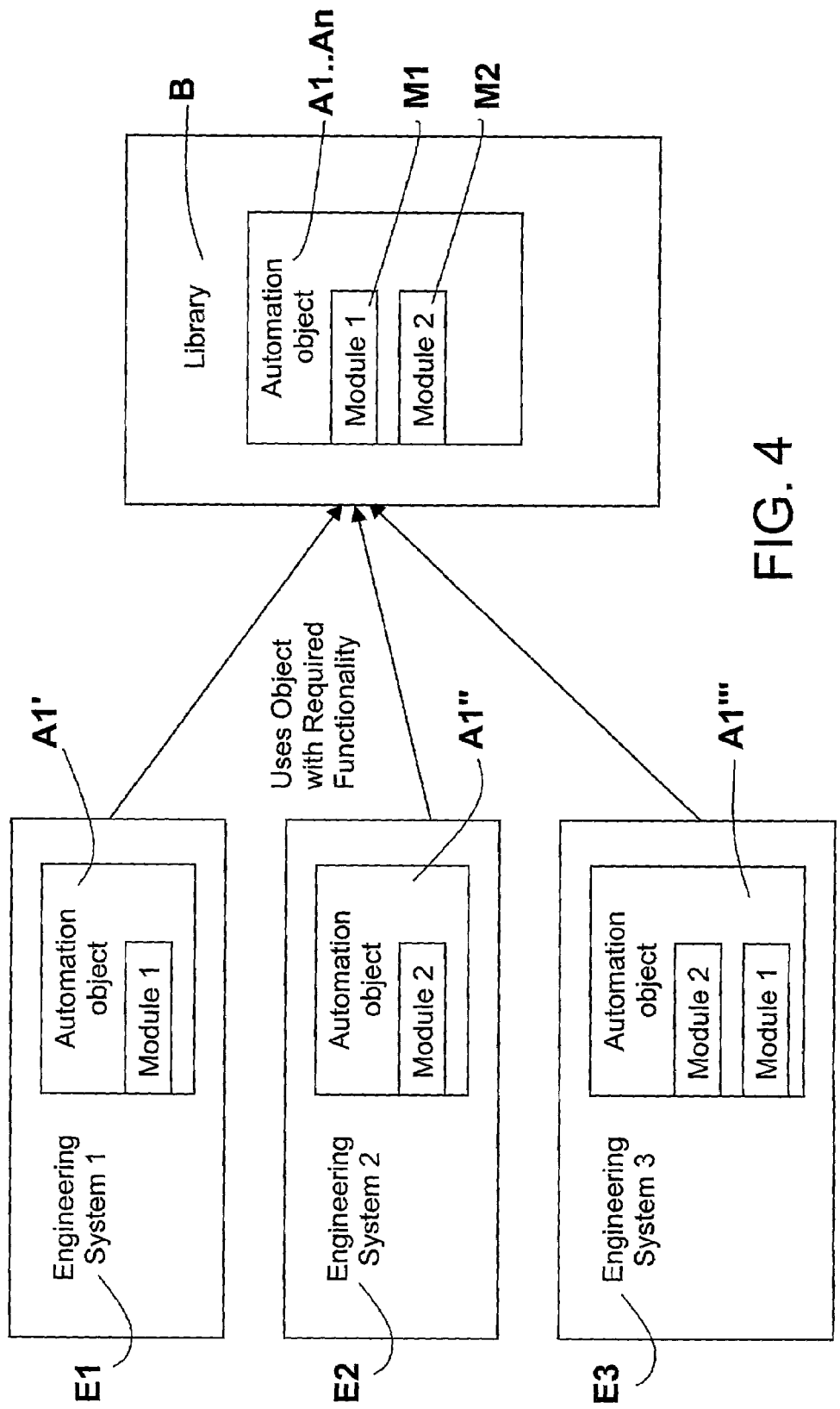

AUTOMATION SYSTEM WITH AUTOMATION OBJECTS CONSISTING OF MODULE COMPONENTS

CROSS REFERENCE TO RELATED APPLICATIONS

This is a Continuation of International Application PCT/DE00/00741, with an international filing date of Mar. 9, 2000, which was published under PCT Article 21(2) in German, and the disclosure of which is incorporated into this application by reference.

FIELD OF THE INVENTION

The present invention relates generally to an automation system with at least one automation object and a method for creating the automation object. More particularly, the invention relates to an automation system using at least one automation object having a specified hierarchy of components and modules where the automation object is embedded into an engineering system.

BACKGROUND OF THE INVENTION

This type of an automation system is used, for example, in the field of automation technology. Conventionally, such an automation system comprises a plurality of individual automation objects, each being necessarily tied to the corresponding engineering system in which the automation object is used. As a result, a manufacturer's automation objects frequently require an independent engineering system. Moreover, the automation objects cannot be used in conjunction with systems in which automation objects of other manufacturers are used.

OBJECTS OF THE INVENTION

An object of the present invention is to provide an automation system in which the above-mentioned problems with conventional techniques are avoided. Specifically, an object of the invention is to provide an automation system in which automation objects are not necessarily restricted by the engineering system in which they are used.

A further object of the invention is to provide an open and distributed automation solution which, in particular, allows automation objects of different manufacturers to be used in the same automation system.

SUMMARY OF THE INVENTION

The above-mentioned and other objects are achieved by an automation system in accordance with the present invention including at least one automation object with a first component for generating a system functionality, a second component for generating a base functionality, and a third component for managing at least one module. Each module includes a first module component for generating a system functionality, a second module component for generating a base functionality and a third module component for generating a technological functionality.

The objects are further achieved by a method for generating an automation object and a method for embedding the automation object into an engineering system. In accordance with this aspect of the invention, for each automation object, a first component is created for generating a system functionality, a second component for generating a base functionality and a third component for managing at least one module. For each module, a first module component is created for generating a system functionality, a second module component is created for generating a base functionality and a third module component is created for generating a technological functionality. The intelligence of the automation object derives from inter-networking the components and the module components.

The first, second and third components form three respective, functional parts of the automation object. The first component comprises the system functionality, i.e., internal services, which essentially offer an implementation basis for the other parts. The second component forms the generic base functionality, i.e., general services, which all automation objects possess and which facilitate their manipulation. The generic base functionality includes, for example, services such as storing and loading an automation object, querying management files, etc. The generic base functionality does not, however, include any technological services such as special control algorithms. The third component includes module management, i.e., all services required to provide the technological functionality contained in the modules. The individual modules of the automation object comprise not only the analogous system functionality and generic base functionality, but can also include the actual technological functionality, such as algorithms for linking automation objects, etc.

The automation object is thus designed as a generic envelope with the automation functionality being factored into independent, exchangeable modules. The automation object manages these modules and provides them upon request, but has no technological functionality of its own. Depending on the specific requirements of the system, the automation object demonstrates the desired functionality by means of the modules it manages. For some of the basic automation tasks, such as interconnection, parameterization, etc., standard modules are defined. The open, distributed structure of the automation object reduces the complexity involved in generating automation objects. Also, the functionality of an automation object can be expanded incrementally, in view of its modular characteristic. In addition, the consumption of resources with respect to storage capacity, etc. is low. Furthermore, splitting the functionality into independent modules results in parallel and distributed use of the automation object. Due to the open structure, the automation object is decoupled from the respective engineering system, making it possible to use automation objects of different manufacturers.

Some of the basic requirements of automation can be taken into account by designing the second component as a standard module and providing it for interconnection and/or parameterization of the automation object.

A unified and clear database for different engineering systems can be achieved by providing the automation object with an object library for managing and/or storing the automation objects with the associated modules.

Resource consumption, particularly with respect to the storage requirement, can be reduced if the automation system has at least one engineering system and the automation objects used in an engineering system access only those modules whose function is required in that engineering system.

Access to the technological functionality of an automation object can be effected in that the engineering system is provided with means for requesting a module list of an automation object that is assigned to engineering system. The automation object, upon request by an engineering system, selects a requested module by giving the engineering system a reference to the requested module. A call by the engineering system for the technological functionality of the module via the reference to that module.

The functionality of the automation objects is split in that the intelligence of an automation object extends over a plurality of independent components and/or modules, each of which is equipped with means for communicating with the other components and/or modules.

BRIEF DESCRIPTION OF THE DRAWINGS

FIG. 4 is a schematic diagram demonstrating use of an automation object in accordance with the present invention with respect to different engineering systems.

DETAILED DESCRIPTION OF THE PREFERRED EMBODIMENTS

Figure 1:
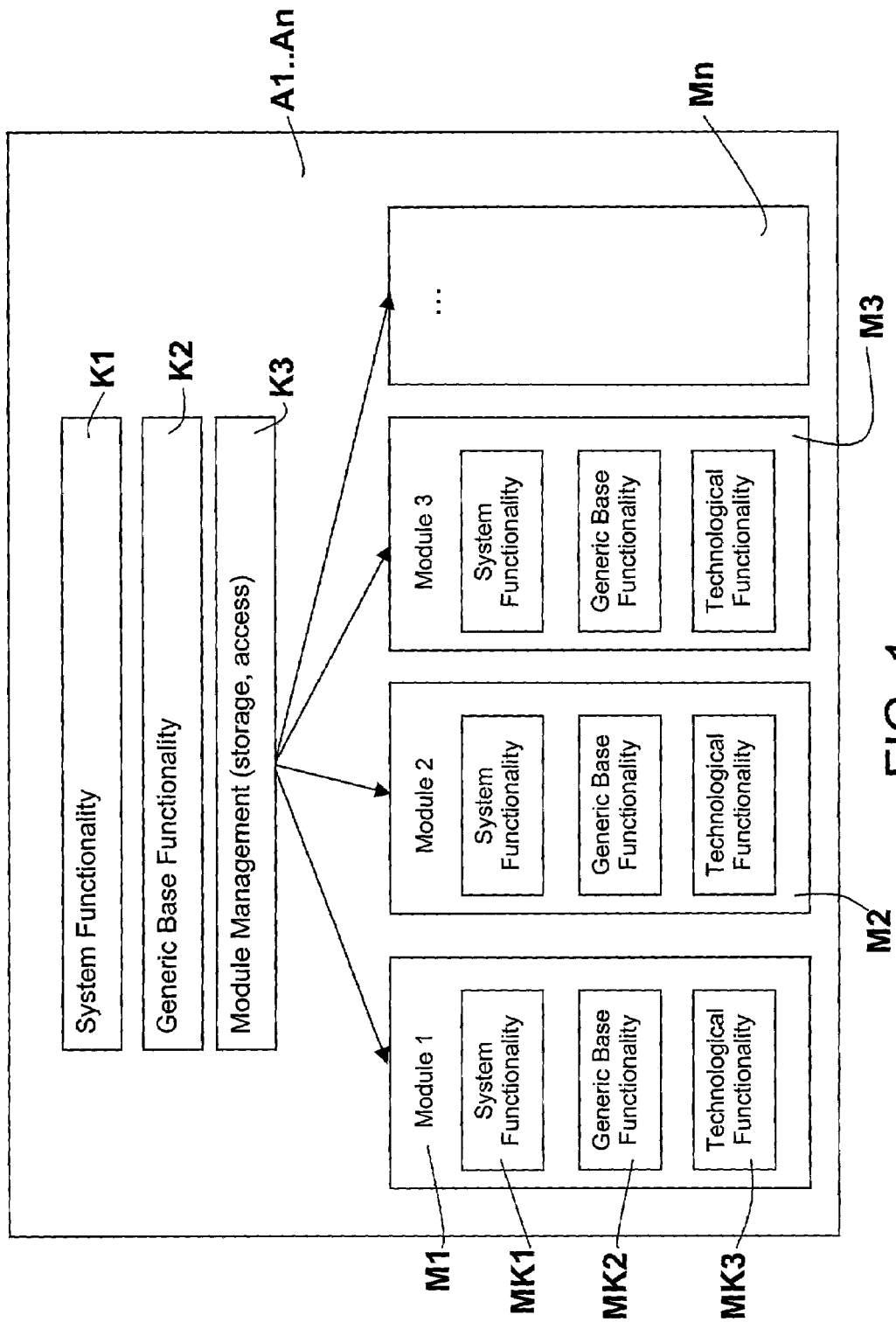
FIG. 1 is a schematic diagram of an exemplary embodiment of the structure of an automation object in accordance with the present invention.

FIG. 1 shows a schematic diagram representing a structure of an automation object, A1 . . . An. The automation object A1 . . . An comprises a first component K1, a second component K2 and a third component K3. The first component K1 forms a functional part of the automation object, referred to as "system functionality." The second component K2 forms the functional part referred to as "generic base functionality" and the third component K3 forms the functional part referred to as "module management." The third component K3 is associated with modules M1 . . . Mn, each of which respectively comprises module components MK1, MK2, MK3. The first module components MK1 represent the system functionality of the respective modules M1 . . . Mn, the second module components MK2 represent the generic base functionality of the modules M1 . . . Mn, and the third components MK3 of modules M1 . . . Mn comprise the actual technological functionality of the automation object.

The first component K1 of the automation object A1 . . . An comprises the system functionality, i.e., the internal services, which essentially offer an implementation basis for the other components. The second component K2 comprises the generic base functionality, i.e., general services, which all automation objects possess and which facilitate the manipulation thereof. Generic base functionality includes, for example, services such as storing and loading an automation object, querying management data, etc. The third component K3 performs module management. Thus, component K3 comprises all services required to provide the technological functionality contained in the modules M1 . . . Mn.

Figure 2:
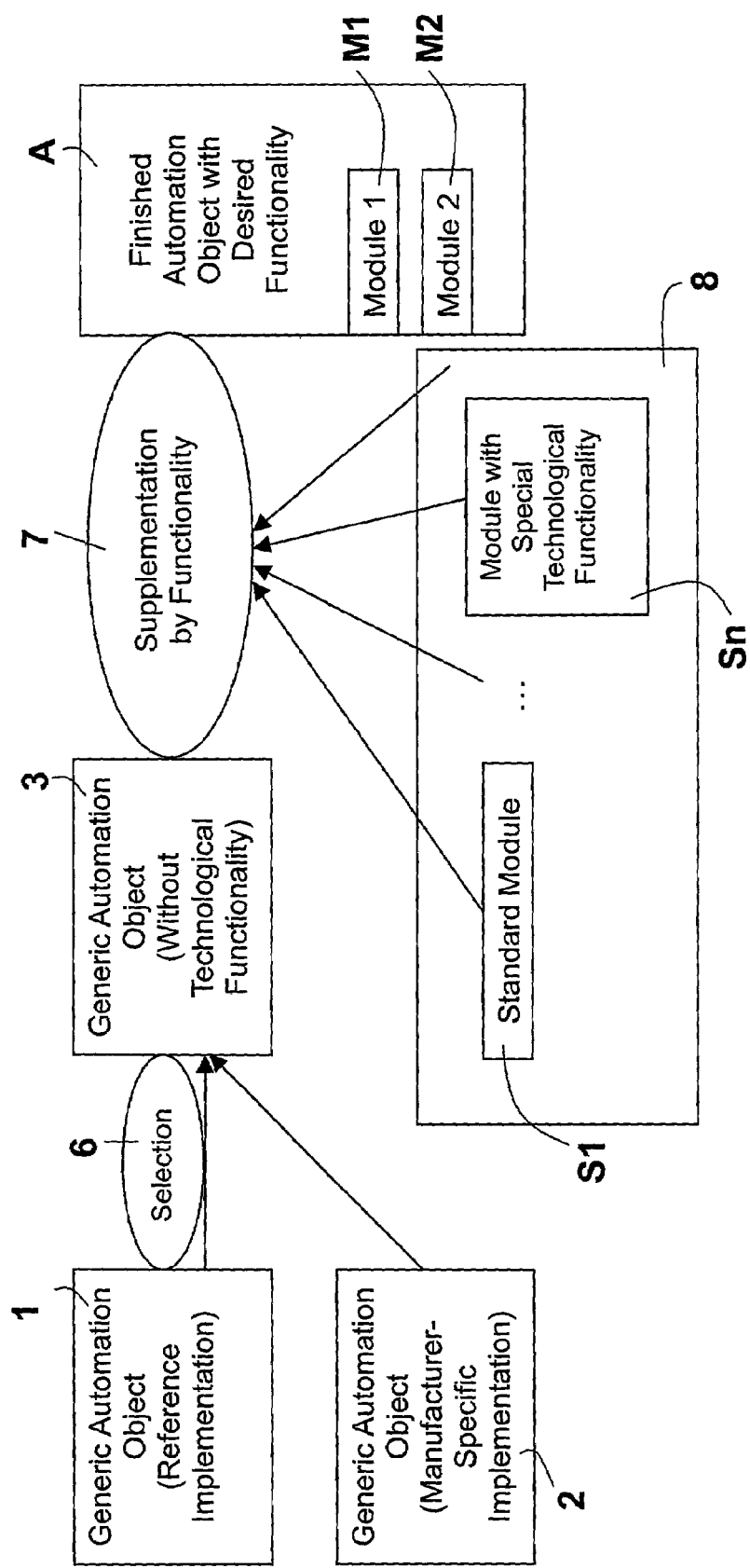
FIG. 2 is a schematic diagram of a production process of an automation object in accordance with the present invention.

FIG. 2 is a schematic representation of the production process of an automation object A. The starting point of this production process is a generic automation object 1 and/or a generic automation object 2, which are present as a reference implementation or a manufacturer-specific implementation, respectively. In a process step 6, either the generic automation object 1 (Reference Implementation) or a generic automation object 2 (Manufacturer-specific Implementation) is selected. Selection of either of these two implementations results in a generic automation object 3, which does not yet have any technological functionality. In process step 7 the automation object is supplemented with functionality. To provide the supplemental technological functionality, the appropriate functionality is chosen from module collection 8, which includes standard modules S1 as well as module Sn containing special technological functionality. The output product of the production process illustrated in FIG. 2 is an automation object A, which is present as a finished automation object of modular construction with the desired functionality, which is reflected in automation object modules M1, M2.

Modularizing the functionality of an automation object, as shown in FIG. 2, drastically reduces the complexity involved in generating an automation object A. In the extreme case, only one more module M1 or M2 with the desired technological functionality has to be developed and embedded into a frame defined by a reference implementation. Predefined frames may also be used for generating the module, so only that part of the module that provides the desired technological functionality has to be implemented.

Figure 3:
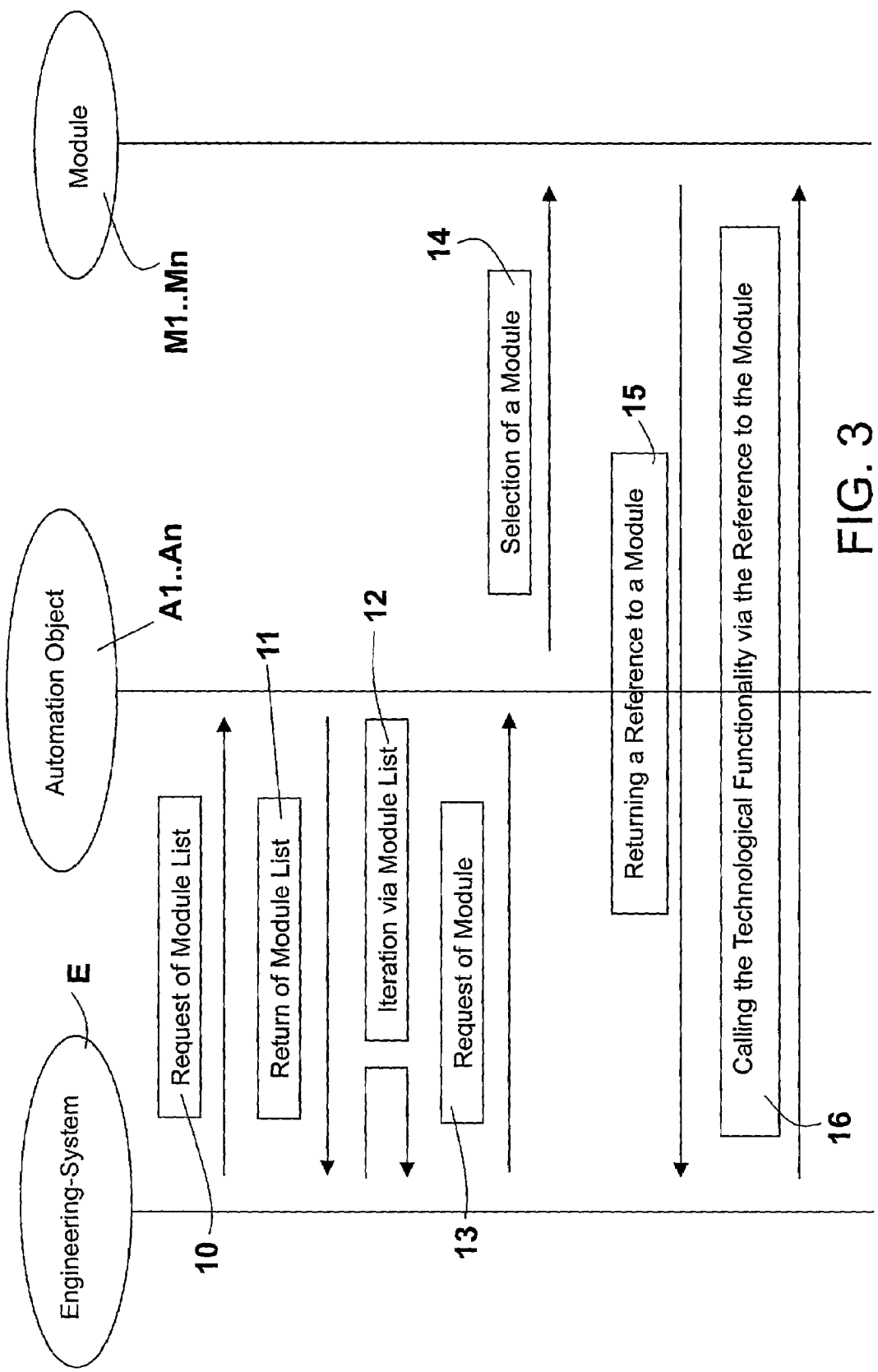
FIG. 3 is a process flow diagram illustrating access to the technological functionality of an automation object in accordance with the present invention.

FIG. 3 illustrates a process flow diagram showing access by an engineering system E to the technological functionality of an automation object A. In a process step 10, the engineering system E requests a module list from the automation object A, chosen from automation objects A1 . . . An. In response to the request, the automation object A returns a module list in step 11. After checking the module list in process step 12, the engineering system E requests, in process step 13, a module M selected from the module list. In response to the engineering system's request, the automation object A, in a process step 14, selects a module M and in process step 15 provides the engineering system E with a reference to the module M. In a process step 16, the engineering system E has the ability to access the desired module by calling the technological functionality by means of the above-described reference to module M.

FIG. 3 illustrates, in particular, that splitting the functionality into independent modules makes possible a parallel and distributed use of the automation object. In addition, it makes clear the decoupling of the automation object A from the respective engineering system E.

FIG. 4 is a schematic diagram illustrating an embodiment of the invention in which an automation object is used in different engineering systems E1, E2, E3. By way of example, the embodiment of FIG. 4 shows a library B with automation objects A1 . . . An. These automation objects A each have the previously discussed modular structure with modules M1, M2. A first engineering system E1 uses a first automation object A1' with the module M1, the second engineering system E2 uses an automation object A1" with the second module M2, and the third engineering system E3 uses an automation object A1'" with the module M1 and the module M2.

A special feature of the structure depicted in FIG. 4 is that each of the engineering systems E1 . . . E3 uses only those components of the automation object A whose functionality it requires. When using an automation object A, chosen from automation objects A1 . . . An, the user has to load only the required functionality in the form of modules. The engineering tool E1 . . . E3 performs this loading process automatically as illustrated in FIG. 3. The engineering tool E1 . . . E3 then communicates with the applicable module M1 and/or M2, which not only provides the required functions but also represents the automation object.

In summary, a system in accordance with the present invention comprises an automation system with at least one automation object A, which has a first component K1 for generating a system functionality, a second component K2 for generating a base functionality and a third component K3 for managing at least one module M1 . . . Mn. Each module has a first module component MK1 for generating a system functionality, a second module component MK2 for generating a base functionality and a third module component MK3 for generating a technological functionality. Providing this hierarchical structure reduces the complexity involved in generating an automation object and permits a step-by-step expansion of the functionality.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An automation system comprising:
   at least one automation object, each automation object having a hierarchy of components, said hierarchy comprising a first component generating system functionality related to internal services of the system, a second component generating base functionality related to generic services that facilitate manipulation of the at least one automation object, and a third component operable to manage at least one module,
   wherein each module comprises at least a module component operable to generate a technological functionality.

2. An automation system as claimed in claim 1, wherein the second component is designed as a standard component and is provided for interconnection with, or parameterization of, the automation object.

3. An automation system as claimed in claim 1, wherein the automation system further comprises an object library operable to manage and store the automation objects and modules corresponding respectively to the automation objects.

4. An automation system as claimed in claim 1, further comprising at least one engineering system, wherein the automation objects correspond to the engineering systems and access only those modules having a function that is required in the corresponding engineering system.

5. An automation system as claimed in claim 1, further comprising at least one engineering system operable to request a module list corresponding to a selected automation object, wherein the selected automation object, upon receiving said request, selects a requested module by providing the engineering system with a reference to the requested module, and the engineering system calls the technological functionality of the module using the reference.

6. An automation system as claimed in claim 1, wherein each component and module is operable to communicate with other ones of the components and modules.

7. An automation system as claimed in claim 1, wherein the functionality of the first component includes an implementation basis for the second and third components, the functionality of the second component supports general services possessed by each automation object and the functionality of the third component includes specific technical functionality contained in each module.

8. The automation system as claimed in claim 1, further comprising at least two engineering systems, each system being operable to request a module list corresponding to a selected automation object,
   wherein the selected automation object, upon receiving said request, selects a requested module by providing the requesting engineering system with a reference to the requested module, and the engineering system calls the technological functionality of the module using the reference, the selected automation object being operable with the at least two engineering systems.

9. The automation system as claimed in claim 1, further comprising at least two engineering systems of different manufacturers, and wherein each of the automation objects corresponds to a respective engineering system of a different manufacturer.

10. The automation system as claimed in claim 1, wherein the automation system automates production of manufactured products.

* * * * *